United States Patent
Vrzic et al.

(10) Patent No.: US 8,428,606 B1
(45) Date of Patent: Apr. 23, 2013

(54) COMMUNICATING CONTROL INFORMATION INCLUDING AN INDEX

(75) Inventors: Sophie Vrzic, Nepean (CA); Mo-Han Fong, Ottawa (CA)

(73) Assignee: Apple Inc., Cupertino, CA (US)

( * ) Notice: Subject to any disclaimer, the term of this patent is extended or adjusted under 35 U.S.C. 154(b) by 869 days.

(21) Appl. No.: 12/202,741

(22) Filed: Sep. 2, 2008

Related U.S. Application Data

(60) Provisional application No. 60/969,212, filed on Aug. 31, 2007.

(51) Int. Cl.
*H04W 72/00* (2009.01)

(52) U.S. Cl.
USPC ........ 455/450; 455/452.1; 455/436; 455/442; 455/426.1; 370/335

(58) Field of Classification Search .................. 455/450, 455/452.1; 370/335
See application file for complete search history.

(56) References Cited

U.S. PATENT DOCUMENTS

| | | | | |
|---|---|---|---|---|
| 2006/0087996 A1* | 4/2006 | Stephens | ........................ | 370/311 |
| 2008/0056183 A1* | 3/2008 | Gorokhov et al. | ............ | 370/329 |
| 2009/0022098 A1* | 1/2009 | Novak et al. | .................. | 370/329 |
| 2009/0168711 A1* | 7/2009 | Fukuoka et al. | ............... | 370/329 |
| 2009/0305712 A1* | 12/2009 | Franceschini et al. | ......... | 455/450 |
| 2010/0022250 A1* | 1/2010 | Petrovic et al. | ............... | 455/450 |
| 2010/0291938 A1* | 11/2010 | Jang | ............................. | 455/450 |

* cited by examiner

*Primary Examiner* — Kamran Afshar
*Assistant Examiner* — Shahriar Behnamian
(74) *Attorney, Agent, or Firm* — Meyertons, Hood, Kivlin, Kowert & Goetzel, P.C.

(57) ABSTRACT

Within a wireless network, a control segment is communicated between a base station and a mobile station, where the control segment is for assigning resources for communication of data in the wireless network. The control segment includes an index that maps to information to enable determination of the assigned resources.

20 Claims, 5 Drawing Sheets

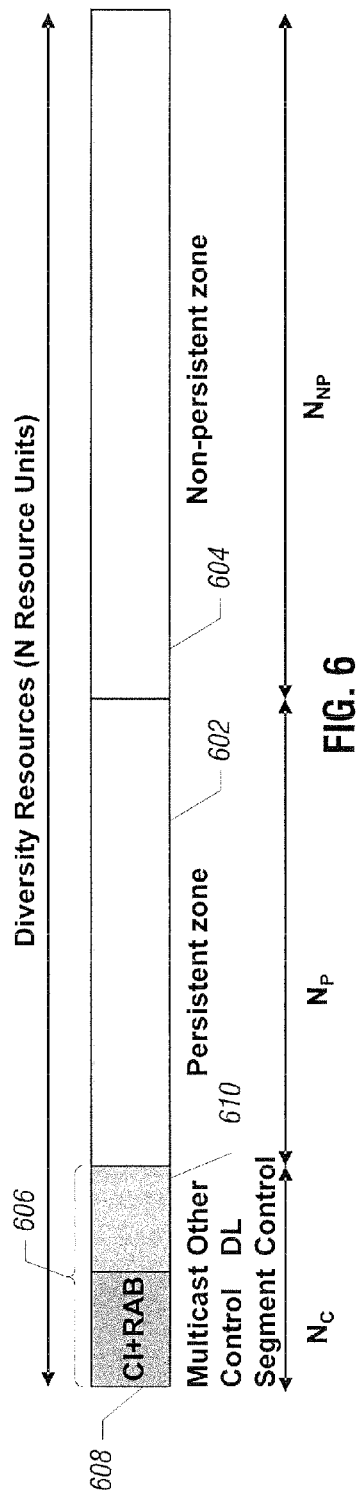
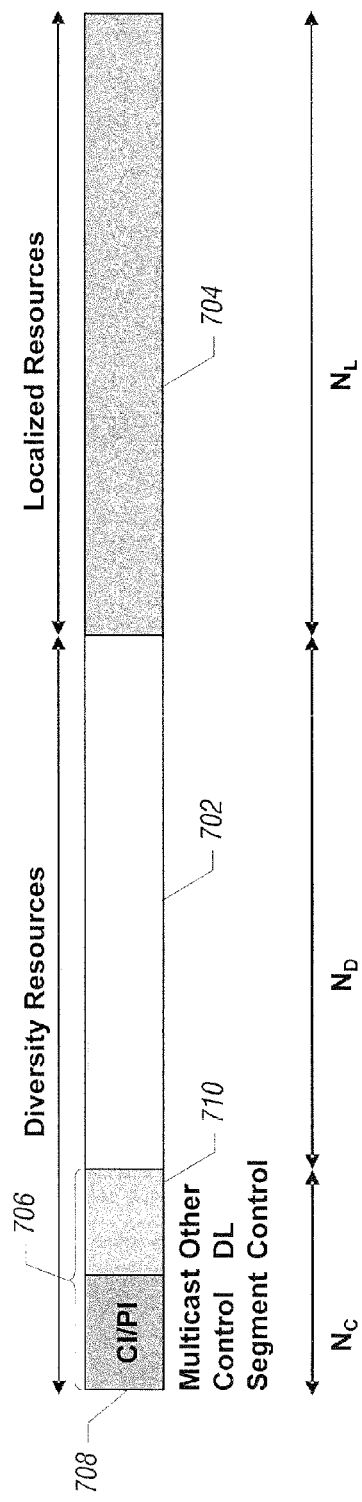
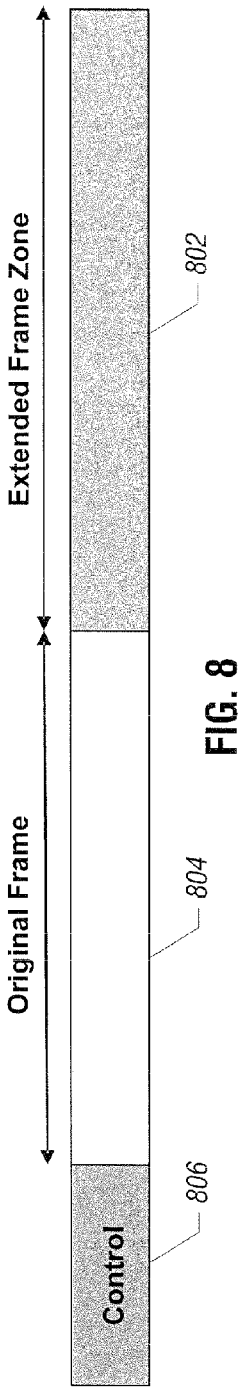
FIG. 6
FIG. 7
FIG. 8

COMMUNICATING CONTROL INFORMATION INCLUDING AN INDEX

CROSS-REFERENCE TO RELATED APPLICATIONS

This application claims the benefit under 35 U.S.C. §119(e) of U.S. Provisional Application Ser. No. 60/969,212, entitled "Control Channel Design for OFDM Implementations," filed Aug. 31, 2007, which is hereby incorporated by reference.

TECHNICAL FIELD

The invention relates generally to communicating control information including an index to provide assignment of resources in a wireless communications network.

BACKGROUND

Various wireless access technologies have been proposed or implemented to enable mobile stations to perform communications with other mobile stations or with wired terminals coupled to wired networks. Examples of wireless access technologies include GSM (Global System for Mobile communications) and UMTS (Universal Mobile Telecommunications System) technologies, defined by the Third Generation Partnership Project (3GPP); and CDMA 2000 (Code Division Multiple Access 2000) technologies, defined by 3GPP2.

As part of the continuing evolution of wireless access technologies to improve spectral efficiency, to improve services, to lower costs, and so forth, new standards have been proposed. One such new standard is the Long Term Evolution (LTE) standard from 3GPP, which seeks to enhance the UMTS wireless network, through the implementation of an OFDM (orthogonal frequency division multiplexing) air interface, to afford greater uplink (from mobile station to base station) and downlink (from base station to mobile station) capacities. The CDMA 2000 wireless access technology from 3GPP2 is also evolving; the evolution of CDMA 2000 is referred to as the Ultra Mobile Broadband (UMB) access technology, which supports significantly higher rates and reduced latencies.

Another type of wireless access technology, also implementing a type of OFDM technology, is based on the IEEE (Institute of Electrical and Electronics Engineers) 802.16d/e specifications, and has been adopted by the Worldwide Interoperability for Microwave Access ("WiMAX") forum to provide wireless broadband access.

The existing control channel design used for many wireless access technologies, including those discussed above, is relatively inefficient. The control channel, which contains control information sent from a base station to mobile stations to enable the mobile stations to properly receive downlink data and to transmit uplink data, typically includes a relatively large amount of information. In some cases, such control channels with relatively large amounts of information are broadcast to multiple mobile stations in a cell or cell sector. The overhead associated with such broadcasts of control channels makes using such techniques inefficient, since substantial amounts of available power and bandwidth may be consumed by the broadcast of such control channels. Note that the power of the broadcast control channel has to be high enough to reach the mobile station with the weakest wireless connection in the cell or cell sector.

SUMMARY

In general, according to an embodiment, a method for use in a wireless network includes communicating, between a base station and a mobile station, a control segment for assigning resources for communication of data in the wireless network. The control segment includes an index that maps to information to enable determination of the assigned resources.

In accordance with some embodiments, to reduce the overhead associated with the communication of control channel (alternatively referred to as a control segment) for assigning resources in a wireless communications network, such control channel is designed to have a reduced amount of control information when compared to conventional control channels. A "control channel" or "control segment" refers to signaling or messaging for communicating information used to control or enable communications between nodes of the wireless communications network.

In some embodiments, to reduce the amount of information that is sent in the control channel, the control channel includes an index that maps to information to enable a determination of resources that are assigned for communicating data in the wireless communications network. The information to which the index is mapped can be contained in a data structure (e.g., lookup table) stored at the transmitting device (e.g., base station) and at the receiving device (e.g., mobile station). The index can have a predefined length (e.g., a predefined number of bits). In one implementation, the index can simply be an integer that can have different values depending upon different assignments of resources. Different values of the index map to different information in the data structure.

Depending on resources that are to be assigned by the base station to one or more mobile stations, the base station can use the data structure stored in the base station to derive a corresponding index. The index can then be transmitted by the base station to each mobile station, which uses the index to access a corresponding part of the data structure stored in the mobile station. Note that the index can be broadcast or multicast to mobile stations. Multicasting control information means that the control information is sent to multiple receivers. Broadcasting control information means that the control information is sent to all receiving entities in a cell or cell sector. In the ensuing discussion, reference is made to "multicasting" the index (and possibly other control information). However, it is noted that reference to multicasting also includes broadcasting (since broadcasting is a specific type of multicasting).

The part of the data structure indexed by the index contains information for the mobile station to determine resources that have been assigned by the base station to enable the mobile station to properly receive downlink data and/or to transmit uplink data. In an alternative embodiment, instead of using a data structure such as a lookup table to map an index to information relating to assignment of resources, the index can be applied to logic (e.g., software logic or hardware logic) that produces information relating to assignment of resources based on an input value of the index.

In accordance with some embodiments, by using the index, the control channel that is multicast to the mobile stations in a cell or cell sector is simplified and shortened. In some embodiments, the index maps to information that provides an indication of the partitioning of resources that are assigned for wireless communication. "Partitioning of resource" refers to dividing or grouping wireless resources into multiple partitions or groups. The index maps to information to enable a mobile station to determine the size of each partition, so that the mobile station can properly decode and/or receive information contained in each partition. Note that the information contained in each partition also includes control information that can be decoded by mobile stations.

Although reference has been made above to communicating an index in a control channel sent in the downlink direction (from base station to mobile station), it is noted that similar techniques can be applied in the uplink direction (from the mobile station to the base station) as well.

Other or alternative features will become apparent from the following detailed description, from the drawings, and from the claims.

BRIEF DESCRIPTION OF THE DRAWINGS

FIGS. 2-8 illustrate exemplary frame formats that contain control channels each including at least one index that maps to information that enables a determination of assigned resources, in accordance with some embodiments.

DETAILED DESCRIPTION

In the following description, numerous details are set forth to provide an understanding of some embodiments. However, it will be understood by those skilled in the art that some embodiments may be practiced without these details and that numerous variations or modifications from the described embodiments may be possible.

Figure 1A:
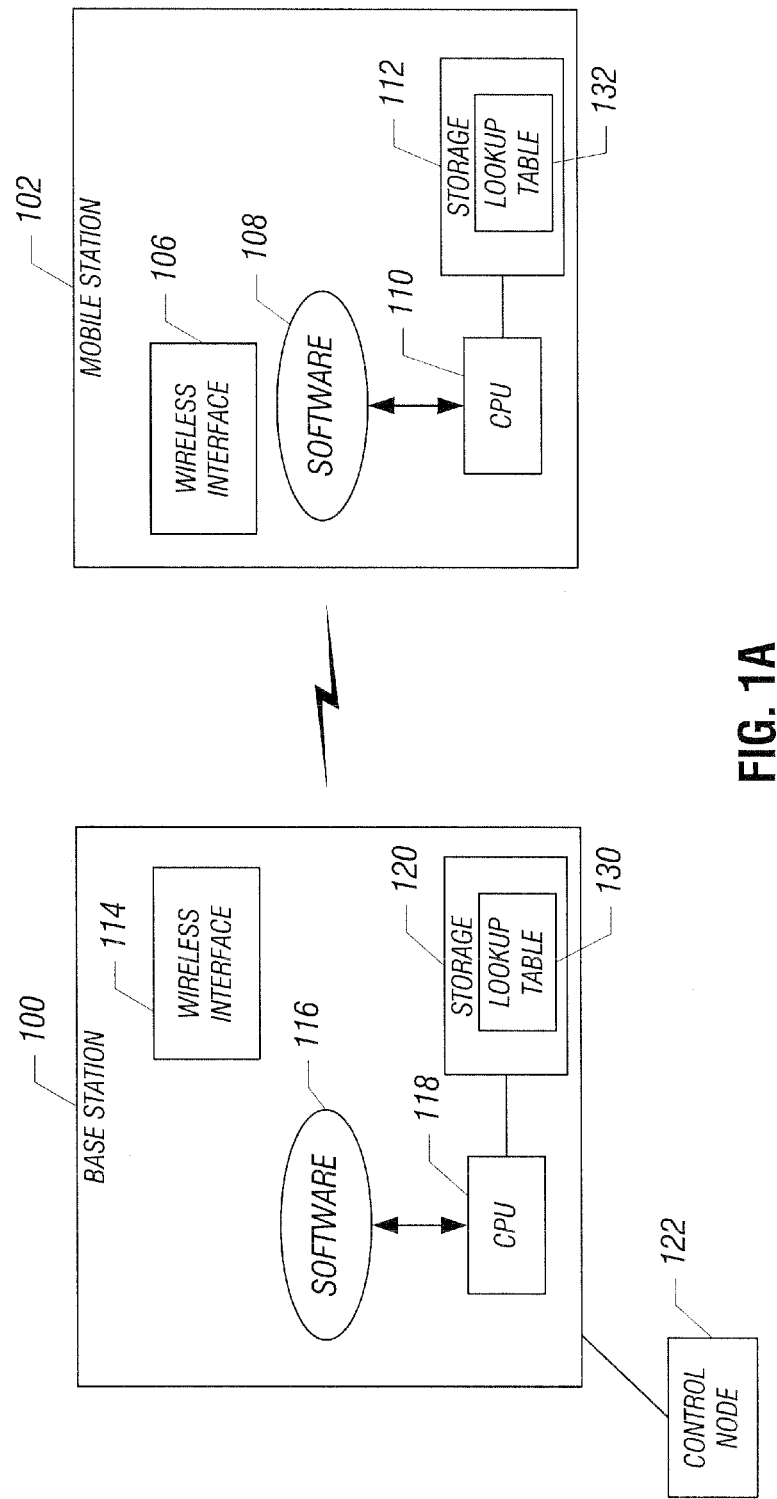
FIG. 1A illustrates an exemplary wireless network in which an embodiment of the invention can be incorporated.

FIG. 1A illustrates an exemplary wireless network that includes a base station 100 that is able to communicate with a mobile station 102 over a wireless link 104 (e.g., a radio frequency or RF link). The term "base station" can refer to any node that is able to communicate wirelessly with one or more mobile stations within a cell or cell sector, including, by way of non-limiting example, nodes referred to as "Node B" (the term used in 3GPP UMTS) and "enhanced node B ("eNodeB)" (the term used in 3GPP LTE). Functionality other than RF access (such as, for example, control functionality) can also be included in such "base stations". In some embodiments, the wireless interface between the base station and mobile station can be based on the orthogonal frequency division multiple access (OFDMA) technology to allow for multiple users to share wireless resources of a wireless communications network in both frequency and time. According to OFDMA, different users can be assigned different sets of subcarriers (at different frequencies) and in different time slots. However, in other embodiments, the wireless interface can be based on other wireless access technologies.

The base station 100 of FIG. 1A can be a base station used in a UMTS (Universal Mobile Telecommunications System) wireless network, as defined by the Third Generation Partnership Project (3GPP); CDMA 2000 (Code Division Multiple Access 2000) wireless network, as defined by 3GPP2; or a WiMAX (Worldwide Interoperability for Microwave Access) wireless network, as defined by the IEEE (Institute of Electrical and Electronics Engineers) 802.16d/e specifications. Reference to a UMTS wireless network is intended to cover a Long-Term Evolution (LTE) wireless network; similarly, reference to a CDMA 2000 wireless network is intended to cover a Ultra Broadband Mobile (UMB) wireless network.

Although reference is made to various exemplary wireless access technologies above, it is noted that techniques according to some embodiments can also be applied to other types of wireless access technologies.

As further depicted in FIG. 1A, the mobile station 102 includes a wireless interface 106 to communicate wirelessly over the wireless link 104. The mobile station 106 also includes software 108 that is executable on one or more central processing units (CPUs) 110 to perform various tasks associated with the mobile station 102. The CPU(s) 110 is (are) connected to a storage 112. The storage 112 contains a lookup table 132 that maps an index to information for enabling a determination of assignment of resources, as discussed above.

Similarly, the base station 100 includes a wireless interface 114 to communicate wirelessly over the wireless link 104. The base station 100 also includes software 116 executable on one more CPUs 118 in the base station 100, which is (are) connected to a storage 120. The storage 120 contains a lookup table 130 that maps an index to information for enabling a determination of assignment of resources.

Although just one base station 100 and mobile station 102 are depicted in FIG. 1A, it is noted that a typical wireless communications network would include multiple base stations or repeaters (for corresponding cells or cell sectors) for communication with multiple mobile stations located within the geographic coverage area of the network.

The base station 100 is further connected to a control node 122, which enables the base station to communicate with other base stations as well as with external network devices, such as network devices connected over an external packet data network, or external circuit-switched network. Examples of the control node 122 include a packet data serving node (PDSN), a serving gateway, and so forth.

In accordance with some embodiments, a "frame" that is transmitted from the base station to the mobile station is divided into multiple partitions, where each partition can have some number of resource units (also referred to data channel units). A resource unit includes some fixed number of tones (subcarriers of different frequencies). For example, each resource unit can be made up of approximately 100 tones, as one example. Assuming there are N resource units, where N>1, these N resource units can be partitioned into multiple partitions or groups.

Figure 2:
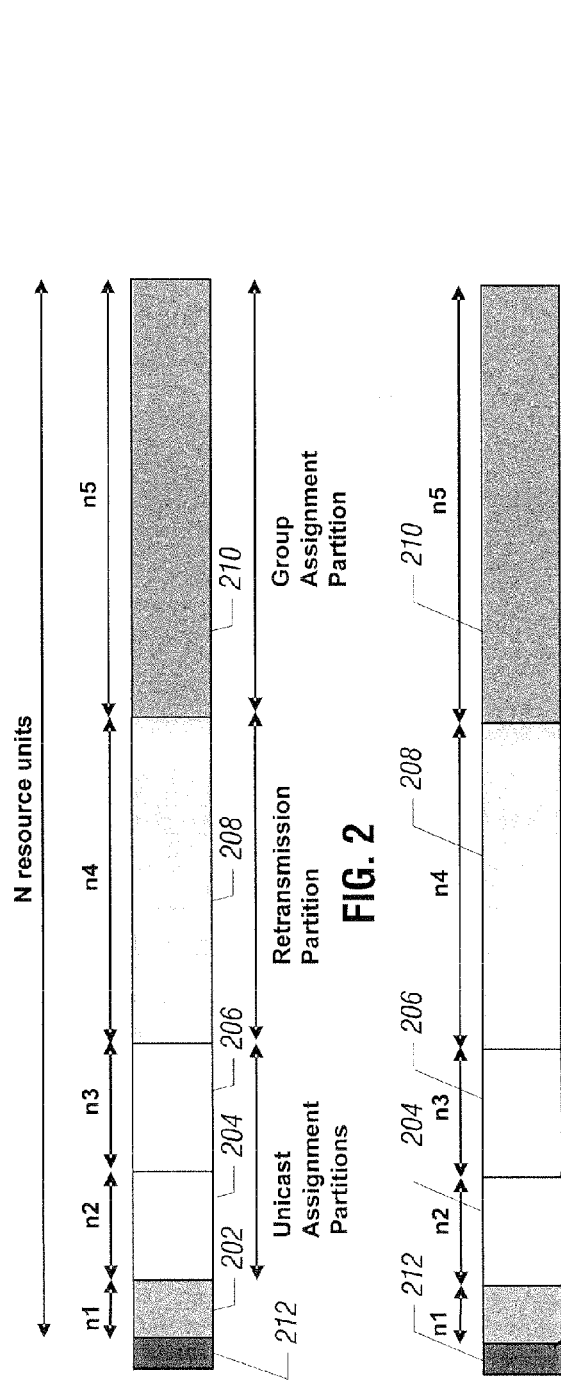

FIG. 2 shows an exemplary format of a frame that contains multiple partitions 202, 204, 206, 208, and 210, along with a control channel 212 (which includes one or plural resource units). A "frame" as used here refers to a collection of data that is sent during one scheduling interval over a wireless link between the base station and mobile station. Although the term "frame" is used, it is noted that the term "frame" is intended to cover any such collections of data, even though such collections may be referred to as superframes, subframes, or by some other name.

Figure 3:
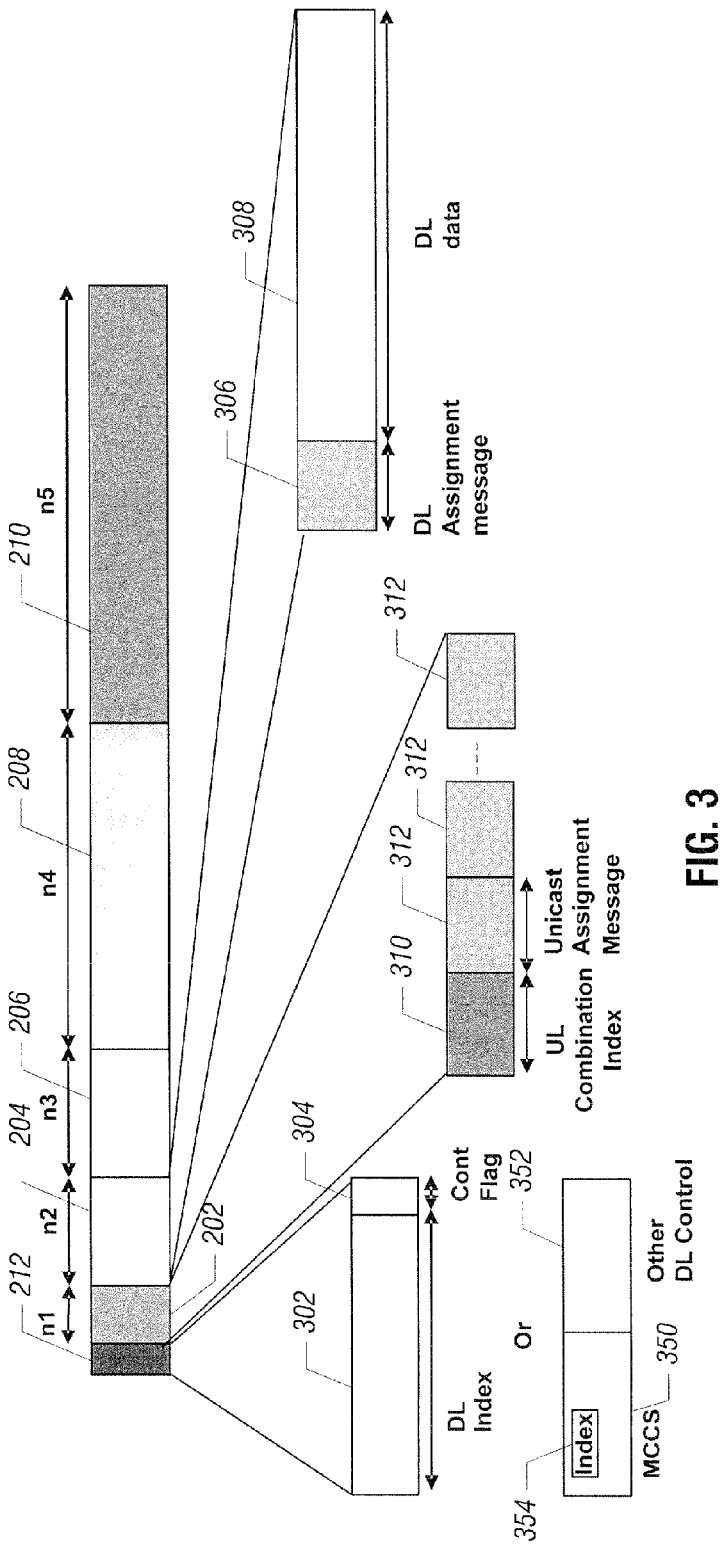

The control channel 212 depicted in FIG. 2 contains the index referred to above (depicted as a downlink index 302 in FIG. 3). The index maps to information in a data structure (e.g., lookup table 130 or 132 in FIG. 1A) that contains information regarding allocation of resources, in this case, allocation of resource units into the partitions of FIG. 2. As explained further below, the index is referred to as either a "combination index" (if a diversity scheme is used) or a "permutation index" (if an adaptive modulation and coding scheme is used). Based on the downlink index in the control channel 212, a mobile station knows the location and size of each of the zones 202, 204, 206, 208, and 210 in the frame.

The control channel 212 may also include other control information. The index is part of a control structure in the control channel 212 that is sent (multicast) to multiple mobile stations in a cell or cell sector. In some implementations, the control channel 212 can also include other control information that is unicast to a mobile station.

In FIG. 2, the partition 202 has n1 resource units, the partition 204 has n2 resource units, the partition 206 has n3 resource units, the partition 208 has n4 resource units, and the partition 210 has n5 resource units. It is noted that the sum of n1, n2, n3, n4, and n5 is equal to N, and that the values of n1, n2, n3, n4, and n5 can be different (or the same). In general, the N resource units of FIG. 2 can be partitioned into k partitions of size $n_1, n_2, \ldots, n_k$, where $k \geq 1$, and where $$\sum_{i=1}^{k} n_i = N.$$

Each of the k partitions is used to communicate control information and/or data.

In the example of FIG. 2, the partition 202 is an uplink assignment partition, which contains uplink control information to allow a mobile station to communicate uplink data in the uplink direction from the mobile station to the base station. Note that the uplink assignment partition 202 can contain uplink control information for multiple mobile stations.

The partitions 204 and 206 are downlink assignment partitions, where each downlink assignment partition contains downlink control information followed by downlink data for the corresponding mobile station (or multiple mobile stations if the respective downlink assignment partition is allocated for sending multicast downlink data). A downlink assignment partition can be a downlink unicast assignment partition, to send downlink unicast data to a particular mobile station, or alternatively, the downlink assignment partition can be a downlink multicast assignment partition for sending downlink multicast data to a group of mobile stations. Although two downlink assignment partitions 204 and 206 are depicted, it is noted that fewer than two or more than two downlink assignment partitions can be included in a frame.

FIG. 2 also shows a retransmission partition 208 that contains retransmitted downlink data for one or more mobile stations that were unable to successfully receive downlink data in a previous frame.

The partition 210 is a group assignment partition, which is used to carry downlink data for mobile stations belonging to a particular group. One example of downlink data that can be carried in the group assignment partition 210, rather than in the downlink assignment partitions 204 and 206, is voice data or other types of real-time data. Because voice data or other types of real-time data are continually transmitted (e.g., every 20 milliseconds), communicating such data in the group assignment partition 210 would be more efficient than communicating such data in the downlink assignment partitions 204 and 206, since certain control information can be omitted.

In addition to the control information contained in the control channel 212, it is noted that further control information can be included in each of the partitions of the frame. For example, such control information can be located at the beginning of each of the partitions 202, 204, 206, 208, and 210.

In some embodiments, any of partitions 202, 204, 206, and 208 can be omitted, with just a subset of partitions 202, 204, 206 and 208 included in the frame sent from the base station to the mobile station. If the retransmission partition 208 is omitted, then one of the downlink assignment partitions 204 and 206 can be used for communicating retransmitted data.

Similarly, if the group assignment partition 210 is omitted, then voice or other real-time data can be transmitted in a downlink assignment partition.

As depicted in FIG. 3, the control channel 212 of each frame includes the downlink index 302 and a continue flag 304, which as explained further below is used to indicate presence of another downlink index in the frame. The format of the control channel 212 that includes the downlink index 302 and continue flag 304 is a first exemplary format. Another exemplary format of the control channel 212 is also depicted in FIG. 3, where this other format includes a multicast control segment (MCCS) 350 and other downlink control information 352 (which can be unicast downlink control information). The multicast control segment 350 includes a downlink index 354, which can be a combination index or permutation index as noted above.

In communications between the base station and mobile station, a diversity scheme can be employed, or alternatively an adaptive modulation and coding (AMC) scheme can be employed. With the diversity scheme, the same information is transmitted along multiple paths (spatial beams) to a particular receiving entity (e.g., a mobile station), possibly with different phases or coding, to ensure that the receiving entity is able to receive the downlink data. With the AMC scheme, on the other hand, adaptive matching of the modulation, coding, and other signal and protocol parameters to conditions of a wireless link is performed to increase the likelihood of successful receipt of data by a receiving entity over the wireless link.

If the diversity scheme is used, then allocation of the resource units is referred to as allocation of diversity resource units. Also, if the diversity scheme is used, then the downlink index 302 sent in the control channel 212 is referred to as a downlink combination index. On the other hand, if the AMC scheme is used, then allocation of resource units is referred to as allocation of AMC or localized resource units, and the downlink index 302 sent in the control channel 212 is referred to as a permutation index.

A combination index represents a partition of the available resource units into plural partitions ordered by size (e.g., increasing order of size). From information retrieved (e.g., from lookup table 132 in FIG. 1A), based on the combination index, the mobile station will know the size of each of the partitions of the frame (e.g., downlink assignment partitions, uplink assignment partitions, etc.) The mobile station can then perform blind detection in each of the partitions, where blind detection refers to the mobile station decoding the control part of each partition to determine whether that partition contains information for the mobile station. To reduce complexity of signaling, some implementations assume there are a fixed number (e.g., M, M>1) of assignments per combination index.

An exemplary combination index lookup table is provided below:

| COMBINATION INDEX | NUMBER OF PARTITIONS | PARTITIONING OF 10 AVAILABLE RESOURCE UNITS |
|---|---|---|
| 0 | 1 | 10 |
| 1 | 2 | 1, 9 |
| 2 | 2 | 2, 8 |
| 3 | 2 | 3, 7 |
| ... | ... | ... |
|  | 3 | 1, 1, 8 |
|  | 3 | 1, 2, 7 |
| ... |  | ... |
|  | 10 | 1, 1, 1, 1, 1, 1, 1, 1, 1, 1 |

In the above example, a combination index value of 0 indicates just one partition in the frame. Assuming 10 resource units are available, then the one partition is assigned all ten resource units. A combination index value of 1 indicates that two partitions in the frame, with the first partition assigned one resource unit and the second partition assigned 9 resource units—this corresponds to a vector of (1, 9). A combination index value of 2 also indicates that two partitions are included in the frame, with the first partition assigned two resource units and the second partition assigned eight resource units—this corresponds to a vector of (2, 8).

Figure 1B:
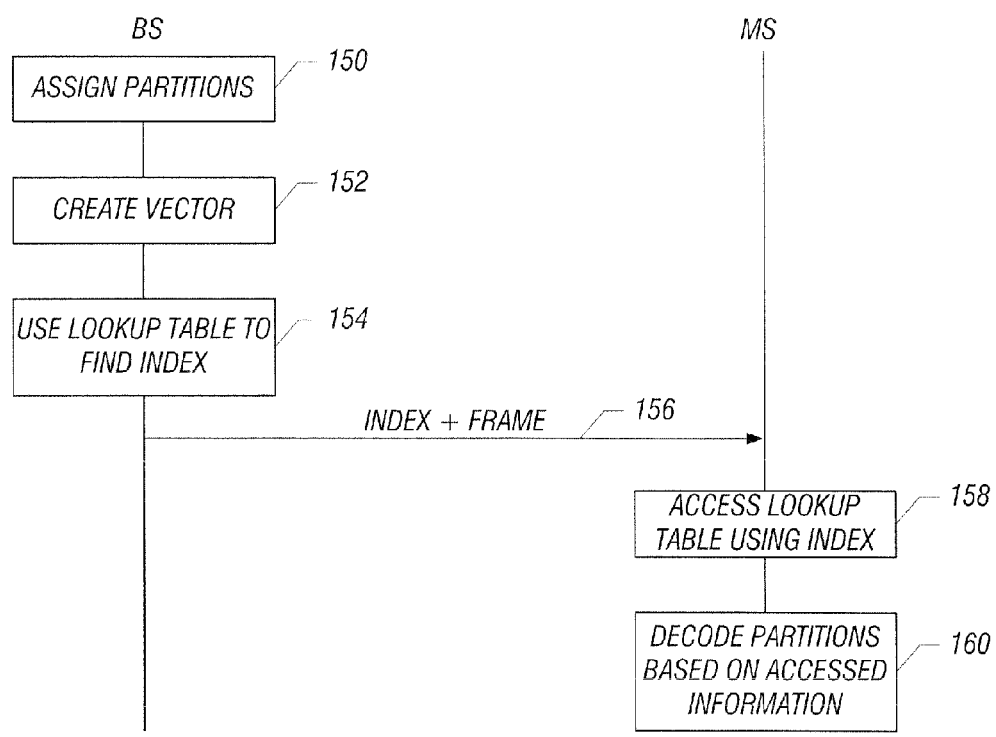
FIG. 1B is a flow diagram of an exemplary procedure for performing wireless communications using a control channel according to some embodiments.

FIG. 1B depicts an exemplary procedure for performing wireless communications in which a downlink index, such as the combination index, is used. A similar procedure can be performed for the case where the downlink index is a permutation index. The base station first assigns (at 150) partitions by dividing the resources into corresponding partitions, such as the partitions 202, 204, 206, 208, and 210 depicted in FIG. 2 or 3. In one example, if there are 30 resource units that are to be assigned for downlink assignment partitions to three mobile stations, and assuming that a fixed maximum number (e.g., 4) of assignments can be performed, then the following assignments are provided:

| | |
|---|---|
| MS1 | 8 resource units, |
| MS2 | 6 resource units, |
| MS3 | 10 resource units, and |
| NULL MS | 6 resource units. |

In the above example, note that the fourth mobile station is a "null" mobile station, since the fourth mobile station does not exist. Mobile station MS1 is assigned eight resource units, mobile station MS2 is assigned six resource units, and mobile station MS3 is assigned ten resource units. The null MS is assigned 6 resource units. In the example above, the uplink assignment partition, retransmission partition, and group assignment partition have been omitted for the purpose of simplifying the example. If such other partitions are present, then the example would also indicate allocation of resource units to such other partitions.

Based on the foregoing example assignments, a vector (6,6,8,10) is created (at 152). Note that each position of the vector specifies a number of resource units assigned to a respective partition. Note also that the partitions have been ordered in the vector by increasing size. This vector is one example of information contained in the lookup table (130 or 132) that maps to the combination index.

The base station uses (at 154) the lookup table 130 (which in this example is a combination index lookup table since the downlink index is a combination index) in the base station 100 to find the combination index corresponding to (6,6,8,10). This combination index is then multicast (at 156) to mobile stations in the control channel 212. Upon receiving the combination index, the mobile station 102 accesses its combination index lookup table 132 to retrieve (at 158) a corresponding entry specified by the combination index. The accessed entry of the lookup table 132 contains resource assignment information in the form of vector (6,6,8,10). From the foregoing vector, the mobile station knows the length of each partition, so that the mobile station is able to perform decoding (at 160) of control information in each of the partitions.

In implementations in which a fixed maximum number of assignments is assumed (e.g., four maximum assignments per combination index), if more than the maximum number of assignments are desired, then a second combination index would have to be used. The second combination index is used to partition the last partition specified by the first combination index. For example, assuming the maximum number of assignments is four, to assign resource units to six mobile stations according to vector (2,4,5,6,6,7), two combination indexes can be used. A first combination index corresponds to a first vector (2,4,5,19). The first vector is derived from the original vector (2,4,5,6,6,7) (note that the first three entries are the same), with the last entry of the first vector assigned a value that is a sum of the last three values of the original vector. What the first vector specifies is a partitioning in which the fourth (last) partition has 19 resource units.

A second combination index can then be provided for partitioning this fourth partition of 19 resource units. This second combination index can partition the fourth partition of 19 resource units as follows: (0,6,6,7), where the last three entries sum to the value 19.

As noted above, the "continue" flag 304 in the downlink resource partition 212 of FIG. 3 is used to indicate that a second downlink combination index is present. The second downlink combination index can also be provided in the control channel 212. Alternatively, the second downlink combination index can be provided elsewhere, such as right after the last partition corresponding to the first combination index. For example, the beginning control part of the last partition, such as the last partition 210 in FIGS. 2 and 3, can be used for carrying the second downlink combination index.

Alternatively, the "continue" flag 304 can be omitted. In this implementation, the control channel 212 always carries two (or multiple) combination indexes, with the second (additional) combination index unused if not needed.

If the AMC scheme is used instead of the diversity scheme, then the downlink index 302 or 354 of FIG. 3 that is sent in the control channel 212 is a permutation index instead of a combination index. The permutation index represents a number of contiguous sub-bands (groups of subcarriers) that are assigned to respective mobile stations. A sub-band includes a number of resource units. Although the term "sub-band" is used here, it is noted that sub-band is a type of partition. Non-contiguous sub-bands can be assigned to a mobile station by including another assignment. The permutation index differs from the combination index in that the permutation index causes assignment of mobile stations in the order of their sub-bands. The sub-bands in the frame are not ordered by size, as is the case with the combination index.

In this scheme, the maximum number of assigned mobile stations can also be fixed. If the maximum number of assignments is p, and the total number of sub-bands is $N_s$, then the permutation index takes the form PI(n1, n2, . . . , $n_p$), where $$\sum_{i=1}^{p} n_i = N_s$$

and $n_1 \geq 0$. In this case, the first mobile station is assigned the first $n_1$ sub-bands, the second mobile station is assigned the next $n_2$ sub-bands, and so forth, until the last mobile station is assigned the following $n_p$ sub-band.

In one example, if the number of sub-bands is 8, and the maximum number of assignments is 8, then the number of possible permutations (assignments of sub-bands to mobile stations) is 128 (7 bits would then be used as the permutation index). In general, if there are N sub-bands with up to N assignments, then the number of permutations is $2^{N-1}$, and N−1 would be used as the number of bits of the permutation index.

An example permutation index lookup table is depicted below (four sub-bands and four possible assignments):

| PERMUTATION INDEX | NUMBER OF ASSIGNMENTS | SUB-BAND ALLOCATIONS |
|---|---|---|
| 0 | 1 | 4 |
| 1 | 2 | 1, 3 |
| 2 | 2 | 2, 2 |
| 3 | 2 | 3, 1 |
| 4 | 3 | 1, 1, 2 |
| 5 | 3 | 1, 2, 1 |
| 6 | 3 | 2, 1, 1 |
| 7 | 4 | 1, 1, 1, 1 |

In the example above, a permutation index value of 1 indicates that there are two assignments (mobile stations), with one sub-band assigned to the first mobile station and three sub-bands assigned to the second mobile station—this corresponds to vector (1,3). A permutation index value of 2 indicates that there are two assignments, with the first mobile station assigned two sub-bands and the second mobile station assigned two sub-bands.

As further depicted in FIG. 3, the downlink assignment partition 204 includes a downlink assignment control message 306 and downlink data 308 associated with the downlink assignment message 306. The downlink assignment control message 306 can be unicast assignment control message, and the downlink data 308 can be downlink unicast data. In accordance with some embodiments, the downlink assignment control message 306, which constitutes the control information for the downlink data 308, is scrambled by the identifier of the mobile station, such as the medium access control (MAC) identifier, MAC ID. Scrambling the control information using an identifier refers to hashing the control information with the identifier, encrypting the control information with the identifier, or otherwise changing the control information based on the identifier. By including the downlink assignment control message 306 in the downlink assignment partition, instead of broadcasting such downlink assignment message, the power used to transmit such control messaging can be optimized for the particular mobile station. This is contrasted to conventional techniques in which lengthy control information is broadcast to multiple mobile stations at relatively high power, which is wasteful of the bandwidth available within a cell or cell sector.

The downlink assignment partition 204 or 206 in the frame of FIG. 3 can also carry multicast data, rather than unicast data. For example, multicast downlink data may be sent in the multi-user, multiple input multiple output (MU-MIMO) context. MIMO refers to the use of multiple antennas at the transmit side and/or the receive side. Multi-user MIMO refers to the transmission of data from multiple antennas at a transmitter to the multiple antennas of multiple mobile stations.

If a downlink assignment partition (204 or 206) contains multicast data, then the downlink assignment control message 306 of FIG. 3 can include a multicast control message, such as an MU-MIMO header. The MU-MIMO header contains the message type, which indicates the number of layers that are multiplexed on the same resources. In some implementations, the MU-MIMO header can also contain a pre-coding matrix index (PMI), which is used for selecting a codeword for coding data. The number of layers can be one layer or multiple layers. For example, if a single layer is used, then the same signal is emitted from each of the transmit antennas (such that redundancy is provided) with appropriate phase (and sometimes gain) coding such that the signal power is maximized at the receiver input. If two layers are used, then independent data is sent across multiple spatial beams to increase throughput of the data in the wireless communication between a transmitter and receiver.

The PMI is used to identify a codeword used for coding data to be sent across a wireless link between a transmitter and receiver (e.g., between a base station and mobile station). A codebook contains multiple entries corresponding to multiple codewords—the PMI in combination with a rank that indicates the number of layers is used to select an entry (codeword) from the codebook. In alternative implementations, instead of using a PMI and codebook-based precoding, other techniques for coding data for multicast transmission can be employed.

In addition to the MU-MIMO header, the downlink assignment message 306 for sending multicast data to multiple mobile stations can also include unicast messages for each assignment (mobile station). Each individual unicast message can contain the modulation coding scheme (MCS) of the assignment. Moreover, each unicast message can be scrambled by the mobile station identifier of the respective mobile station.

FIG. 3 also shows the content of the uplink assignment partition 202, which includes an uplink combination index 310, and one or more uplink unicast control messages 312 for corresponding mobile stations. The uplink combination index 310 has a fixed length in accordance with some implementations, and is decoded by each mobile station sequentially to allow the mobile station to determine how the mobile station's uplink resources are partitioned. Note that the uplink resources are not part of the uplink assignment partition 202—instead, the uplink resources can be in a separate band (for a frequency division duplex or FDD system) or in the same band (for a time division duplex or TDD system). More specifically, the uplink combination index 310 maps to information that identifies partitioning of uplink resources for mobile stations. As with the downlink combination index, the uplink combination index can map to a location in an uplink combination index lookup table (which is different from the downlink index lookup table 130 or 132 in FIG. 1) to retrieve the information that identifies partitioning of uplink resources. The mobile station first reads the uplink combination index 310 to determine how uplink resources are partitioned; next, the mobile station decodes each of the uplink unicast control messages 312 until the mobile station finds its control message. The uplink unicast control message 312 can include such information as the specific coding that is used (e.g., modulation coding scheme or MCS). Moreover, each uplink unicast control message 312 can be scrambled based on the identifier (e.g., MAC ID) of the corresponding mobile station.

In addition to uplink unicast assignment messages 312, as depicted in FIG. 3, some implementations of the uplink assignment partition 202 can also include uplink access grant messages and uplink group assignment messages. An uplink access grant message is sent by a base station to a mobile station to grant access of an uplink to the mobile station. The access grant message contains the identifier of the mobile station that initiated the request for access. The access grant message is scrambled by the sequence that a mobile station used in the uplink random access channel that was sent by the mobile station to initiate the request for access of the uplink.

In addition, the uplink assignment partition 202 can also include one or more uplink group assignment messages. An uplink group assignment message is used to assign a group of mobile stations for the purpose of communicating real-time data such as voice. The uplink group assignment messages are similar to the downlink group assignment messages discussed above, except the uplink group assignment messages are used for uplink communications, whereas the downlink group assignment messages are used for downlink communications.

For improved efficiency, the resource units for the uplink assignment partition 202 can further be divided into sub-resource units. In other words, a resource unit can be divided into sub-resource units. The use of sub-resource units may be more efficient since uplink control messages for a particular mobile station may have relatively small length, and thus may not use up an entire resource unit.

The technique of sub-dividing resource units into sub-resource units can also be employed to the other partitions of a frame.

Figure 4:
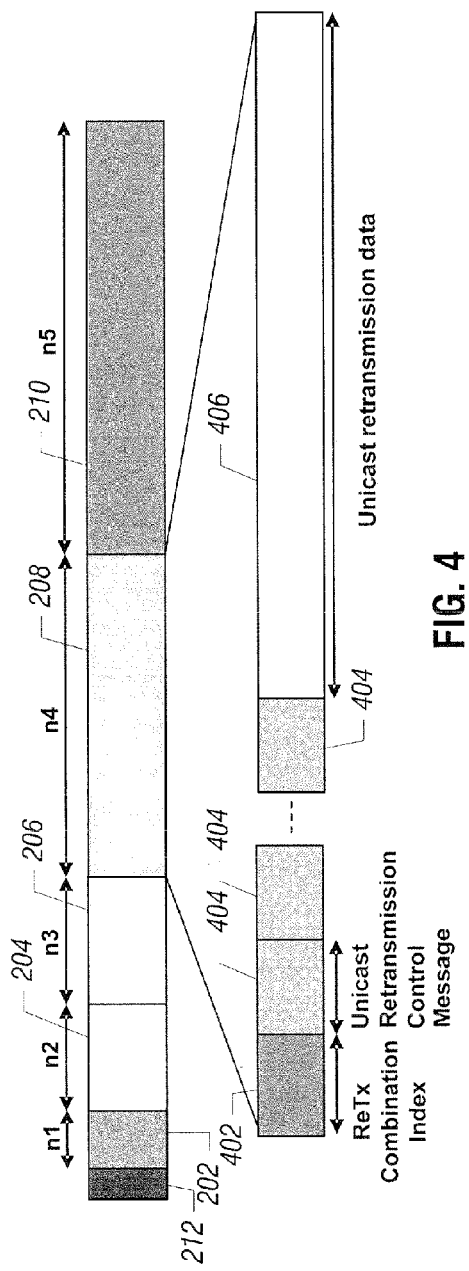

FIG. 4 shows the content of the retransmission partition 208 in greater detail. The beginning of the retransmission partition 208 contains a retransmission combination index 402, followed by downlink unicast control message 404 for each corresponding re-transmitted data. As with the other combination indexes discussed above, the retransmission combination index 402 maps to information that indicates the length of each of the downlink unicast control message 404 for the corresponding re-transmitted data. For example, the retransmission combination index 402 can map to a location of a retransmission combination index lookup table. Once a mobile station knows the length of each downlink unicast control message 404, the mobile station can decode each of the downlink unicast control messages 404 until the mobile station finds its downlink unicast control message 404 (if present in the retransmission partition 208). The downlink unicast retransmission control message 404 can include a resource identifier (to identify which resource unit is being retransmitted). The downlink unicast control information for each retransmitted data can also include the identifier of the mobile station that is the target of the retransmitted data.

The retransmission combination index 402 can be scrambled by a unique code that identifies the retransmission partition 208. A mobile station can use the unique code to descramble the retransmission combination index 402.

Once the mobile stations that are expecting a retransmission identify the retransmission partition 208, then the mobile stations are able to decode the resource identifier (and possibly the mobile station identifier) for each retransmission to determine which entry in the retransmission partition 208 corresponds to its retransmission. The retransmitted data is contained in the retransmission data part 406 of the retransmission partition 208.

Figure 5:
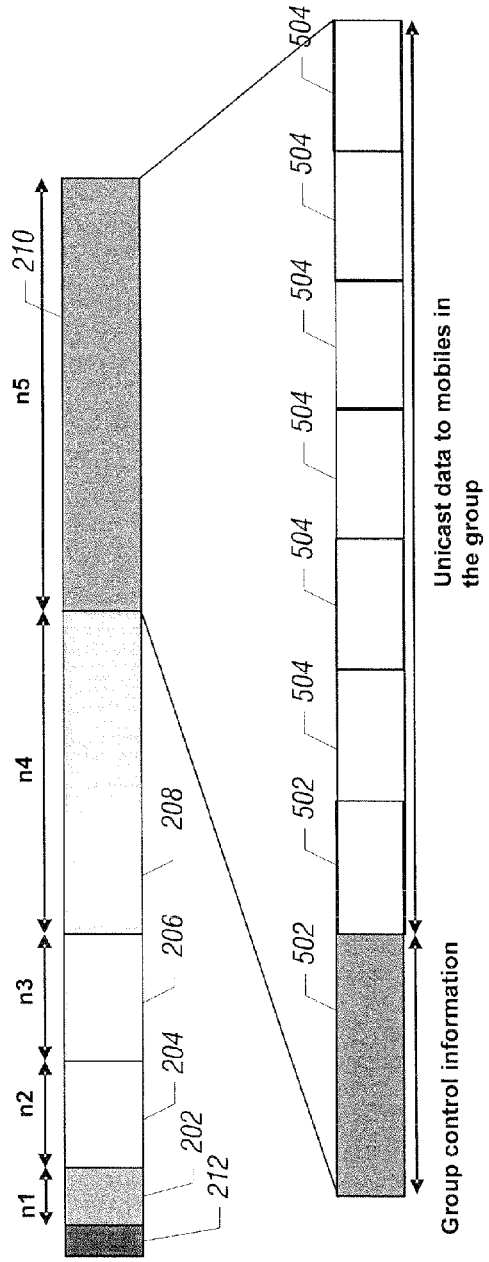

FIG. 5 shows the content of the group assignment partition 210. The group assignment partition 210 contains group control information 502, followed by unicast data blocks 504 for corresponding mobile stations in the group. The group control information 502 is broadcast by the base station. In some embodiments, the group control information 502 contains a group resource assignment (GRA) bitmap or other message format that conveys the group assignments. The bitmap can be a collection of bits, where each bit corresponds to a respective mobile station within the group. If a particular bit within the bitmap has a first state, then that is an indication that the group assignment partition 210 contains a data block 504 for that mobile station. On the other hand, if that particular bit of the bitmap has a second state, then that is an indication that no data block 504 exists for the particular mobile station.

To identify a particular group, the GRA bitmap is scrambled by the respective group ID. At the receiving end, the mobile station can descramble the GRA bitmap using the group ID. A mobile station that belongs to a first group would not be able to descramble a scrambled GRA bitmap for a second group (which has been scrambled with a second group ID).

If there are multiple groups within the group assignment partition 210, then another combination index is broadcast at the beginning of the group assignment partition 210 to indicate how the resource units of the group assignment partition 210 are partitioned among the groups.

In accordance with some embodiments, assignment of resource units can include non-persistent assignment of resource units and persistent assignment of resource units. In the examples above, it was assumed that the resource units assigned are non-persistent (in other words, the resource units assigned to mobile stations can change from scheduling interval to scheduling interval). Persistently allocated resource units are those resource units that remain allocated to particular mobile stations from scheduling interval to scheduling interval (such as every 20 milliseconds).

FIG. 6 illustrates a frame in which resource units can be allocated into both a persistent zone 602 and a non-persistent zone 604. The non-persistent zone 604 can include partitions such as partitions 202, 204, 206, and 208 described in connection with FIG. 2. The persistent zone 602 is typically used for communicating data that is repeated within each scheduling interval, such as voice or other real-time data. Thus, the voice data or other real-time data that would be provided in the group assignment partition 210 of FIG. 2 would instead be provided in the persistent zone 602 of FIG. 6. Stated differently, the group assignment partition of FIG. 2 can be included in the persistent zone 602 of FIG. 6.

FIG. 6 also shows a control channel 606 that contains a multicast control segment 608 that includes a combination index (similar to the combination index described above) for the non-persistent zone 604, as well as RAB (resource availability bitmap) control information for the persistent zone 602. The RAB control information specifies the service that is provided for transfer of user data (in this case, real-time data, such as voice) between the base station and mobile station.

In some embodiments, the control channel 606 further includes other downlink control information 610, such as a downlink acknowledge (ACK) message and/or power control information. A downlink ACK message is sent (unicast) to a particular mobile station to acknowledge an uplink data transmission made by the mobile station. Note that multiple downlink ACK messages can be sent as part of the other downlink control information 610 to acknowledge uplink data transmissions from multiple mobile stations.

The power control information is also sent (unicast) to an individual mobile station to perform power control of uplink transmission of the mobile station. Since each of the downlink ACK message and the power control information is intended for a particular mobile station, the downlink ACK message and/or power control information can be power controlled for that specific mobile station.

The presence of both a persistent zone and a non-persistent zone can be used for allocation of diversity resources (when the diversity scheme is used). For localized resources (for when the AMC scheme is used), the resources assigned are non-persistent resources only.

FIG. 7 shows the format of a frame that includes both diversity resources 702 and localized resources 704. In this case, a control channel 706 includes a multicast control segment 708 that has both a combination index (for the diversity resources 702) and a permutation index (for the localized resources 704). The control channel 706 can also include other downlink control information 710.

In some embodiments, extended frames can also be provided. An extended frame is supported by defining a separate zone. An example of an extended frame zone is depicted as 802 in FIG. 8. The extended frame zone 802 can include one or more extended frames. A control channel 806 associated with the original frame 804 specifies the presence of the extended frame zone 802.

Additionally, in the extended frame zone 802, a control channel is repeated every m frames. Thus, each control channel in the extended frame zone 802 contains control information for m frames.

An extended frame zone can be defined in the downlink direction as well as in the uplink direction.

By using some embodiments of the invention as described above, more efficient use of wireless network bandwidth is used for transmitting control channels. By including an index in a control channel that has a portion that is multicast, the amount of information that is contained in the multicast portion is reduced. Moreover, in accordance with some embodiments, further control information can be included in unicast portions of a frame. Since control information unicast to a particular mobile station can be power controlled for that mobile station, the power level for the unicast control information can be optimized.

Instructions of software discussed above (e.g., software 108 and 116 in FIG. 1) are loaded for execution on the processor (e.g., CPUs 110 and 118). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; and optical media such as compact disks (CDs) or digital video disks (DVDs).

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method for use in a wireless network, comprising:
    transmitting a control segment for assigning resources for communication of data in the wireless network, the control segment including an index mapped to information indicating a number of partitions of a frame to enable determination of the assigned resources.

2. The method of claim 1, wherein the index maps to a location of a data structure stored in at least one of a base station and a mobile station, the location of the data structure contains the information to enable determination of the assigned resources and the information indicates the number of resources assigned for each partition.

3. The method of claim 1, wherein the data structure is stored in both a base station and a mobile station, the method further comprising:
    determining, in the base station, the resources to assign for communication in the wireless network; and
    accessing, in the base station, the data structure based on the determined resources to assign to identify the index.

4. The method of claim 1, wherein transmitting the control segment comprises multicasting at least a portion of the control segment to multiple mobile stations, the at least a portion that is multicast containing the index.

5. The method of claim 4, wherein the control segment is part of a frame sent by a base station, the method further comprising:
    including unicast messages in the frame, wherein the unicast messages contain downlink data for respective ones of at least some of the mobile stations.

6. The method of claim 4, wherein the control segment is part of a frame sent by a base station, the method further comprising:
    including a retransmission partition in the frame, wherein the retransmission partition contains retransmitted data for one or more of the mobile stations.

7. The method of claim 4, wherein the control segment is part of a frame sent by a base station, the method further comprising:
    including a group assignment partition in the frame, wherein the group assignment partition is used for communicating real-time data.

8. The method of claim 4, wherein the control segment is part of a frame sent by a base station, the method further comprising:
    including an uplink assignment partition in the frame, wherein the uplink assignment partition contains uplink control information for one or more of the mobile stations.

9. The method of claim 1, wherein assigning the resources comprises partitioning the resources into a plurality of partitions, wherein at least one of the plurality of partitions is used to communicate downlink data.

10. The method of claim 9, further comprising:
    including a control portion in the at least one partition that is decodable by a mobile station such that the mobile station is able to receive the downlink data in the at least one partition.

11. The method of claim 10, further comprising scrambling the control portion using an identifier of the mobile station, such that the mobile station is able to descramble the control portion.

12. The method of claim 1, wherein transmitting the control segment comprises transmitting the control segment for a diversity scheme, and wherein the index is a combination index that maps to the information that specifies assignment of resources into partitions ordered according to sizes of the partitions.

13. The method of claim 1, wherein transmitting the control segment comprises transmitting the control segment for an adaptive modulation and coding scheme, and wherein the index is a permutation index that maps to the information that specifies assignment of resources.

14. The method of claim 1, further comprising including in the control segment at least one of (1) downlink acknowledgment messages to acknowledge receipt of uplink data, and (2) power control information to perform power control of uplink communications.

15. A base station comprising:
a wireless interface to communicate with mobile stations; and
a processor to:
cause transmission of a control channel from the wireless interface, at least a portion of the control channel is multicast to the mobile stations, and wherein the portion of the control channel includes an index mapped to information that indicates a number of partitions of a frame to enable determination of assignment of resources.

16. The base station of claim 15, wherein the control channel is transmitted as part of a frame, and wherein the assignment of resources includes partitioning of the resources among a plurality of partitions, at least one of the partitions containing downlink data to be unicast to one of the mobile stations, and wherein the at least one partition contains control message intended for the one mobile station.

17. The base station of claim 16, wherein a second one of the partitions contains multicast data to send to plural ones of the mobile stations, and wherein the second partition further contains a multicast control header associated with the plural mobile stations.

18. The base station of claim 17, wherein the multicast control header includes a multiuser multiple input multiple output (MU-MIMO) header.

19. An article comprising at least one non-transitory computer readable storage medium containing instructions that when executed by a processor cause a mobile station to:
receive a control segment having a portion that is multicast by a base station, wherein the portion includes an index; and
use the index to map to information that indicates a number of partitions of a frame to enable the mobile station to determine assignment of resources by the base station for downlink and uplink communications.

20. The article of claim 19, wherein receiving the control segment comprises receiving at least a portion of the control segment that is multicast by the base station to multiple mobile stations, the at least a portion that is multicast containing the index.

* * * * *